(12) United States Patent
Watanabe et al.

(10) Patent No.: US 12,517,082 B2
(45) Date of Patent: Jan. 6, 2026

(54) GAS SENSOR

(71) Applicant: NGK INSULATORS, LTD., Nagoya (JP)

(72) Inventors: Yusuke Watanabe, Nagoya (JP); Ryo Hashikawa, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 349 days.

(21) Appl. No.: 18/176,658

(22) Filed: Mar. 1, 2023

(65) Prior Publication Data

US 2023/0288366 A1 Sep. 14, 2023

(30) Foreign Application Priority Data

Mar. 11, 2022 (JP) ................................. 2022-038359

(51) Int. Cl.
| | | |
|---|---|---|
| *G01N 27/41* | (2006.01) | |
| *G01N 27/407* | (2006.01) | |
| *G01N 27/409* | (2006.01) | |
| *G01N 27/419* | (2006.01) | |
| *G01N 27/48* | (2006.01) | |
| *G01N 33/00* | (2006.01) | |

(52) U.S. Cl.
CPC ......... *G01N 27/41* (2013.01); *G01N 27/4076* (2013.01); *G01N 27/409* (2013.01); *G01N 27/419* (2013.01); *G01N 27/48* (2013.01); *G01N 33/0037* (2013.01)

(58) Field of Classification Search
CPC ............... G01N 27/41; G01N 27/4076; G01N 27/409; G01N 27/419; G01N 33/0037; G01N 27/4072; G01N 27/4075; G01N 27/4077; G01N 27/48

See application file for complete search history.

(56) References Cited

U.S. PATENT DOCUMENTS

| | | | |
|---|---|---|---|
| 2016/0266062 A1* | 9/2016 | Nishijima | ............ G01N 27/419 |
| 2020/0116665 A1* | 4/2020 | Onishi | ............... G01N 27/4071 |
| 2021/0302356 A1 | 9/2021 | Yoshida et al. | |

FOREIGN PATENT DOCUMENTS

| | | |
|---|---|---|
| JP | 2012-173146 A | 9/2012 |
| JP | 2021-162465 A | 10/2021 |

* cited by examiner

*Primary Examiner* — James Lin
*Assistant Examiner* — Vivian A Tran
(74) *Attorney, Agent, or Firm* — MATTINGLY & MALUR, PC

(57) ABSTRACT

A sensor element includes: a plurality of internal spaces which sequentially communicate from a gas inlet, and in which respective inner electrodes are arranged; an outer electrode; a porous body region covering the outer electrode; and a plurality of electrochemical pump cells capable of pumping in or out oxygen between the internal spaces and an outside, and a ratio A/B is 0.07 or more, where A is a magnitude of a limiting current when a main pump cell including a main pump electrode in a first internal space located closest to the inlet and the outer pump electrode pumps in oxygen to the first internal space in a case where a pump in current evaluation gas is introduced, B is a magnitude of a limiting current when oxygen is pumped out from the first internal space in a case where a pump-out current evaluation gas is introduced.

8 Claims, 4 Drawing Sheets

GAS SENSOR

CROSS-REFERENCE TO RELATED APPLICATION

The present application claims priority from Japanese application JP2022-038359, filed on Mar. 11, 2022, the contents of which is hereby incorporated by reference into this application.

BACKGROUND OF THE INVENTION

Field of the Invention

The present invention relates to a limiting current type gas sensor, and, in particular, to a gas sensor used under a rich atmosphere.

Description of the Background Art

A limiting current type gas sensor (e.g., a NOx sensor and an oxygen sensor) including a sensor element containing an oxygen-ion conductive solid electrolyte, such as yttria stabilized zirconia, as a main component has already been known, for example. In the gas sensor, a measurement gas is introduced into a space (an internal space) located inside the sensor element. Control to maintain a potential difference between an inner electrode disposed to face the internal space and a reference electrode disposed inside the element and to be in contact with a reference gas at a predetermined value in accordance with a desired oxygen concentration in the space is performed.

The control is generally performed by applying, in an electrochemical pump cell including the inner electrode, an outer (out-of-space) electrode disposed outside the space, and a solid electrolyte region present between the electrodes, a pumping voltage across the electrodes to pump in or out oxygen between the internal space and an outside. Due to application of the pumping voltage, an oxygen pumping current having a magnitude and a direction in accordance with an oxygen concentration in the space flows between the inner electrode and the outer electrode.

As examples of such a gas sensor, a gas sensor in which an outer electrode is disposed on an outer surface of a sensor element and a ceramic layer is disposed so that a slit for providing predetermined diffusion resistance is formed around the outer electrode and, further, a gas sensor in which a porous body is buried in the slit to enhance mechanical strength thereof have already been known (see Japanese Patent Application Laid-Open No. 2021-162465, for example).

A gas sensor including a sensor element having a configuration in which an oxygen concentration detection cell and an oxygen pump cell are laminated via an insulating layer along a thickness direction of the element and a detection gas is introduced into the element through a diffusion control part formed of a porous body provided to a portion of the insulating layer has also already been known (see Japanese Patent Application Laid-Open No. 2012-173146, for example).

A limiting current type gas sensor as described above is sometimes used in an environment in which a rich gas having an air-fuel ratio smaller than a theoretical air-fuel ratio can be introduced to the element, for example, along an exhaust path from a gasoline engine.

In this case, when the rich gas is introduced into an internal space, operation (pumping operation) of pumping in oxygen from outside the element to the internal space is typically performed in an electrochemical pump cell to maintain an oxygen concentration in the space constant. That is to say, a pumping voltage is applied so that oxygen is pumped in to the internal space (oxygen ions move from outside the element to the internal space), and an oxygen pumping current in accordance with the pumping voltage flows between an inner electrode and an outer electrode.

In pumping in oxygen, the pumping voltage and the oxygen pumping current tend to increase with increasing amount of the rich gas introduced into the internal space. An excessive increase in richness of the measurement gas, however, makes it difficult to pump in oxygen from an outside in accordance with the increase in pumping voltage, and may cause so-called blackening to draw out oxygen in the solid electrolyte instead. Blackening is an irreversible phenomenon, and, once blackening is caused, the gas sensor can no longer be used.

Blackening is more likely to be caused in a gas sensor in which a portion around the outer electrode has higher diffusion resistance as with the gas sensor having a configuration in which the outer electrode is covered with the ceramic layer and the gas sensor having a configuration in which the portion around the outer electrode is covered with the porous body disclosed in Japanese Patent Application Laid-Open No. 2021-162465.

SUMMARY

The present invention is directed to a limiting current type gas sensor, and, in particular, relates to a gas sensor used under a rich atmosphere.

According to the present invention, a gas sensor capable of sensing a predetermined gas component in a measurement gas includes: a sensor element formed of an oxygen-ion conductive solid electrolyte; and a controller controlling operation of the gas sensor. The sensor element includes: a plurality of internal spaces which sequentially communicate with each other from an inlet for the measurement gas under predetermined diffusion resistance, and in which respective inner electrodes are arranged; an out-of-space pump electrode disposed at a location other than the plurality of internal spaces; a porous body region covering the out-of-space pump electrode; and a plurality of electrochemical pump cells arranged to correspond to the respective internal spaces, and pumping in or out oxygen between the plurality of internal spaces and an outside of the sensor element by applying pump voltages across the inner electrodes in the respective internal spaces and the out-of-space pump electrode from predetermined pump power supplies. The plurality of internal spaces include: a first internal space which is located closest to the inlet, and in which a main pump electrode is disposed as one of the inner electrodes; and a measurement internal space which is located farthest from the inlet, and in which a measurement electrode is disposed as one of the inner electrodes. The plurality of electrochemical pump cells include: a main pump cell including the main pump electrode and the out-of-space pump electrode; and a measurement pump cell including the measurement electrode and the out-of-space pump electrode. The controller controls operation of the plurality of electrochemical pump cells other than the measurement pump cell to adjust an oxygen concentration in one or more of the plurality of internal spaces corresponding to the plurality of electrochemical pump cells other than the measurement pump cell, controls operation of the measurement pump cell to allow a measurement pump current in accordance with a concentration of the predetermined gas component to flow between the measurement electrode and the out-of-space pump electrode, and identifies the concentration of the predetermined gas component based on a magnitude of the measurement pump current. A ratio AB is 0.07 or more, where A is a magnitude of a reference pump-in current as a limiting current when the main pump cell pumps in oxygen to the first internal space based on control performed by the controller in a case where a pump-in current evaluation gas having a known oxygen concentration is introduced from the inlet to the plurality of internal spaces, B is a magnitude of a reference pump-out current as a limiting current when the main pump cell pumps out oxygen from the first internal space based on control performed by the controller in a case where a pump-out current evaluation gas having a known oxygen concentration is introduced from the inlet to the plurality of internal spaces.

According to the present invention, a gas sensor that can perform good measurement not only under a lean atmosphere but also under a rich atmosphere at least in a range from stoichiometric composition to a X, value of 0.97 is achieved.

It is thus an object of the present invention to provide a gas sensor that can suitably be used under a rich atmosphere.

These and other objects, features, aspects and advantages of the present invention will become more apparent from the following detailed description of the present invention when taken in conjunction with the accompanying drawings.

DESCRIPTION OF THE PREFERRED EMBODIMENTS

General Configuration of Gas Sensor

Figure 1:
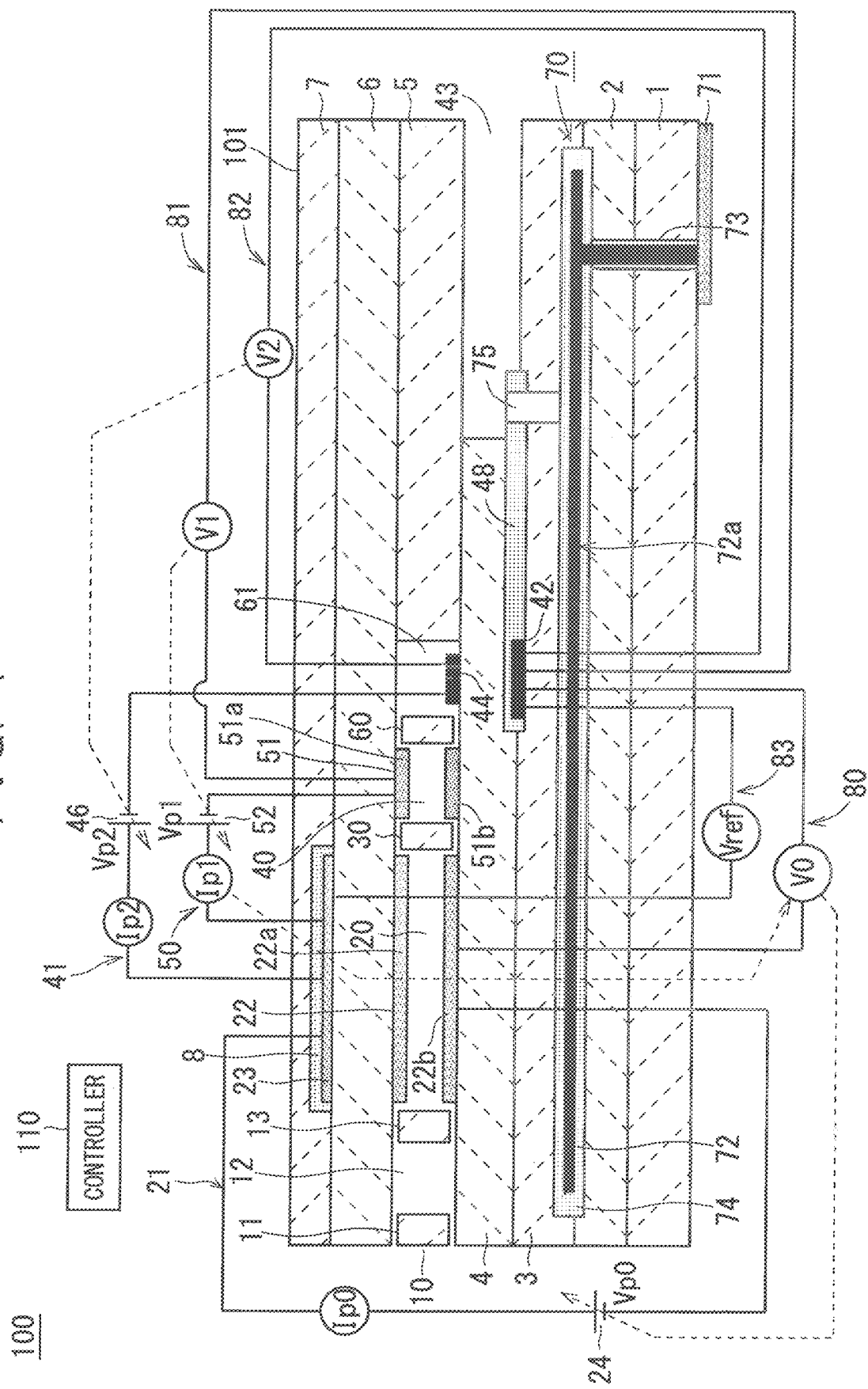
FIG. 1 is a diagram schematically showing one example of a configuration of a gas sensor 100.

FIG. 1 is a diagram schematically showing one example of a configuration of a gas sensor 100 according to the present embodiment. The gas sensor 100 is a limiting current type NOx sensor sensing NOx and measuring a concentration thereof using a sensor element 101. The gas sensor 100 further includes a controller 110 controlling operation of each part and identifying the NOx concentration based on a NOx current flowing through the sensor element 101. FIG. 1 includes a vertical cross-sectional view taken along a longitudinal direction of the sensor element 101.

The sensor element 101 is a planar (an elongated planar) element body of ceramics mainly having a structure in which six solid electrolyte layers, namely, a first substrate layer 1, a second substrate layer 2, a third substrate layer 3, a first solid electrolyte layer 4, a spacer layer 5, and a second solid electrolyte layer 6 each formed of zirconia ($ZrO_2$) (e.g., yttria stabilized zirconia (YSZ)) as an oxygen-ion conductive solid electrolyte are laminated in the stated order from a bottom side of FIG. 1. The solid electrolyte forming these six layers is dense and airtight. A surface on an upper side and a surface on a lower side of each of these six layers in FIG. 1 are hereinafter also simply referred to as an upper surface and a lower surface, respectively. A part of the sensor element 101 formed of the solid electrolyte as a whole is generically referred to as a base part.

The sensor element 101 is manufactured, for example, by performing predetermined processing, printing of circuit patterns, and the like on ceramic green sheets corresponding to the respective layers, then laminating them, and further firing them for integration.

Between a lower surface of the second solid electrolyte layer 6 and an upper surface of the first solid electrolyte layer 4 in one leading end portion of the sensor element 101, a first diffusion control part 11 doubling as a gas inlet 10, a buffer space 12, a second diffusion control part 13, a first internal space 20, a third diffusion control part 30, a second internal space 40, a fourth diffusion control part 60, and a third internal space 61 are formed adjacent to each other to communicate in the stated order.

The buffer space 12, the first internal space 20, the second internal space 40, and the third internal space 61 are spaces (regions) inside the sensor element 101 looking as if they were provided by hollowing out the spacer layer 5, and having an upper portion, a lower portion, and a side portion respectively defined by the lower surface of the second solid electrolyte layer 6, the upper surface of the first solid electrolyte layer 4, and a side surface of the spacer layer 5. The gas inlet 10 may similarly look as if it was provided by hollowing out the spacer layer 5 at a leading end surface (at the left end in FIG. 1) of the sensor element 101 separately from the first diffusion control part 11. In this case, the first diffusion control part 11 is formed inside and adjacent to the gas inlet 10.

The first diffusion control part 11, the second diffusion control part 13, the third diffusion control part 30, and the fourth diffusion control part 60 are each provided as two horizontally long slits (whose openings have longitudinal directions perpendicular to the page of FIG. 1). A part extending from the gas inlet 10 to the third internal space 61 as the farthest internal space is also referred to as a gas distribution part.

At a location farther from the leading end than the gas distribution part is, a reference gas introduction space 43 having a side portion defined by a side surface of the first solid electrolyte layer 4 is provided between an upper surface of the third substrate layer 3 and a lower surface of the spacer layer 5. For example, air is introduced into the reference gas introduction space 43 as a reference gas at measurement of the NOx concentration.

An air introduction layer 48 is a layer formed of porous alumina, and the reference gas is introduced into the air introduction layer 48 through the reference gas introduction space 43. The air introduction layer 48 is formed to cover a reference electrode 42.

The reference electrode 42 is an electrode formed to be sandwiched between the upper surface of the third substrate layer 3 and the first solid electrolyte layer 4, and the air introduction layer 48 leading to the reference gas introduction space 43 is provided around the reference electrode 42 as described above. As will be described below, an oxygen concentration (oxygen partial pressure) in the first internal space 20 and the second internal space 40 can be measured using the reference electrode 42.

In the gas distribution part, the gas inlet 10 (first diffusion control part 11) is a part opening to an external space, and a measurement gas is taken from the external space into the sensor element 101 through the gas inlet 10.

The first diffusion control part 11 is a part providing predetermined diffusion resistance to the taken measurement gas.

The buffer space 12 is a space provided to guide the measurement gas introduced through the first diffusion control part 11 to the second diffusion control part 13.

The second diffusion control part 13 is a part providing predetermined diffusion resistance to the measurement gas introduced from the buffer space 12 into the first internal space 20.

In introducing the measurement gas from outside the sensor element 101 into the first internal space 20, the measurement gas having abruptly been taken into the sensor element 101 through the gas inlet 10 due to pressure fluctuations (pulsation of exhaust pressure in a case where the measurement gas is an exhaust gas of a vehicle) of the measurement gas in the external space is not directly introduced into the first internal space 20 but is introduced into the first internal space 20 after concentration fluctuations of the measurement gas are canceled through the first diffusion control part 11, the buffer space 12, and the second diffusion control part 13. This makes the concentration fluctuations of the measurement gas introduced into the first internal space 20 almost negligible.

The first internal space 20 is an internal space located closest to the gas inlet 10, and is provided as a space to adjust oxygen partial pressure of the measurement gas introduced through the second diffusion control part 13. The oxygen partial pressure is adjusted by operation of a main pump cell 21.

The main pump cell 21 is an electrochemical pump cell including an inner pump electrode 22, an outer (out-of-space) pump electrode 23, and the second solid electrolyte layer 6 sandwiched between these electrodes. The inner pump electrode 22 has a ceiling electrode portion 22a provided on substantially the entire lower surface of a portion of the second solid electrolyte layer 6 facing the first internal space 20, and the outer pump electrode 23 is provided in a region, on an upper surface of the second solid electrolyte layer 6 (one main surface of the sensor element 101), corresponding to the ceiling electrode portion 22a to be exposed to the external space.

The inner pump electrode 22 is formed on upper and lower solid electrolyte layers (the second solid electrolyte layer 6 and the first solid electrolyte layer 4) defining the first internal space 20. Specifically, the ceiling electrode portion 22a is formed on the lower surface of the second solid electrolyte layer 6, which provides a ceiling surface to the first internal space 20, and a bottom electrode portion 22b is formed on the upper surface of the first solid electrolyte layer 4, which provides a bottom surface to the first internal space 20. The ceiling electrode portion 22a and the bottom electrode portion 22b are connected by a conducting portion (not illustrated) provided on a side wall surface (an inner surface) of the spacer layer 5 forming opposite side wall portions of the first internal space 20.

The ceiling electrode portion 22a and the bottom electrode portion 22b are provided to be rectangular in plan view. Only the ceiling electrode portion 22a or only the bottom electrode portion 22b may be provided.

The inner pump electrode 22 and the outer pump electrode 23 are each formed as a porous cermet electrode. In particular, the inner pump electrode 22 to be in contact with the measurement gas is formed using a material having a weakened reducing ability with respect to a NOx component in the measurement gas. For example, the inner pump electrode 22 is formed as a cermet electrode of an Au—Pt alloy containing Au of approximately 0.6 wt % to 1.4 wt % and $ZrO_2$ to have a porosity of 5% to 40% and a thickness of 5 μm to 20 μm. A weight ratio Pt:$ZrO_2$ of the Au—Pt alloy and $ZrO_2$ is only required to be approximately 7.0:3.0 to 5.0:5.0.

On the other hand, the outer pump electrode 23 is formed, for example, as a cermet electrode of Pt or an alloy thereof and $ZrO_2$ to be rectangular in plan view.

The main pump cell 21 can pump out oxygen in the first internal space 20 to the external space or pump in oxygen in the external space to the first internal space 20 by applying a desired pump voltage $Vp0$ across the inner pump electrode 22 and the outer pump electrode 23 from a variable power supply 24 to allow a main pump current $Ip0$ to flow between the inner pump electrode 22 and the outer pump electrode 23 in a positive or negative direction. The pump voltage $Vp0$ applied across the inner pump electrode 22 and the outer pump electrode 23 in the main pump cell 21 is also referred to as a main pump voltage $Vp0$.

To detect the oxygen concentration (oxygen partial pressure) in an atmosphere in the first internal space 20, the inner pump electrode 22, the second solid electrolyte layer 6, the spacer layer 5, the first solid electrolyte layer 4, the third substrate layer 3, and the reference electrode 42 constitute a main sensor cell 80 as an electrochemical sensor cell.

The oxygen concentration (oxygen partial pressure) in the first internal space 20 can be known by measuring electromotive force $V0$ as a potential difference between the inner pump electrode 22 and the reference electrode 42 in the main sensor cell 80.

Furthermore, the controller 110 performs feedback control of the main pump voltage $Vp0$ so that the electromotive force $V0$ is constant, thereby to control the main pump current $Ip0$. The oxygen concentration in the first internal space 20 is thereby maintained at a predetermined constant value.

The third diffusion control part 30 is a part providing predetermined diffusion resistance to the measurement gas having an oxygen concentration (oxygen partial pressure) controlled by operation of the main pump cell 21 in the first internal space 20, and guiding the measurement gas to the second internal space 40.

The second internal space 40 is provided as a space to further adjust the oxygen partial pressure of the measurement gas introduced through the third diffusion control part 30. The oxygen partial pressure is adjusted by operation of an auxiliary pump cell 50. The oxygen concentration of the measurement gas is adjusted with higher accuracy in the second internal space 40.

After the oxygen concentration (oxygen partial pressure) is adjusted in advance in the first internal space 20, the auxiliary pump cell 50 further adjusts the oxygen partial pressure of the measurement gas introduced through the third diffusion control part 30 in the second internal space 40.

The auxiliary pump cell 50 is an auxiliary electrochemical pump cell including an auxiliary pump electrode 51, the outer pump electrode 23 (not limited to the outer pump electrode 23 and only required to be any appropriate electrode outside the sensor element 101), and the second solid electrolyte layer 6. The auxiliary pump electrode 51 has a ceiling electrode portion 51a provided on substantially the entire lower surface of a portion of the second solid electrolyte layer 6 facing the second internal space 40.

The auxiliary pump electrode 51 is provided in the second internal space 40 in a similar form to the inner pump electrode 22 provided in the first internal space 20 described previously. That is to say, the ceiling electrode portion 51*a* is formed on the second solid electrolyte layer 6, which provides a ceiling surface to the second internal space 40, and a bottom electrode portion 51*b* is formed on the first solid electrolyte layer 4, which provides a bottom surface to the second internal space 40. The ceiling electrode portion 51*a* and the bottom electrode portion 51*b* are rectangular in plan view, and are connected by a conducting portion (not illustrated) provided on the side wall surface (inner surface) of the spacer layer 5 forming opposite side wall portions of the second internal space 40.

As with the inner pump electrode 22, the auxiliary pump electrode 51 is formed using a material having a weakened reducing ability with respect to the NOx component in the measurement gas.

The auxiliary pump cell 50 can pump out oxygen in an atmosphere in the second internal space 40 to the external space or pump in oxygen in the external space to the second internal space 40 by applying a desired voltage (an auxiliary pump voltage) Vp1 across the auxiliary pump electrode 51 and the outer pump electrode 23 under control performed by the controller 110.

To control the oxygen partial pressure in the atmosphere in the second internal space 40, the auxiliary pump electrode 51, the reference electrode 42, the second solid electrolyte layer 6, the spacer layer 5, the first solid electrolyte layer 4, and the third substrate layer 3 constitute an auxiliary sensor cell 81 as an electrochemical sensor cell. In the auxiliary sensor cell 81, electromotive force V1 as a potential difference caused between the auxiliary pump electrode 51 and the reference electrode 42 in accordance with the oxygen partial pressure in the second internal space 40 is detected.

The auxiliary pump cell 50 performs pumping using a variable power supply 52 whose voltage is controlled based on the electromotive force V1 detected in the auxiliary sensor cell 81. The oxygen partial pressure in the atmosphere in the second internal space 40 is thereby feedback controlled to a low partial pressure having substantially no effect on measurement of NOx.

At the same time, a resulting auxiliary pump current Ip1 is used to control the electromotive force in the main sensor cell 80. Specifically, the auxiliary pump current Ip1 is input, as a control signal, into the main sensor cell 80, and, through control of the electromotive force V0 therein, the oxygen partial pressure of the measurement gas introduced through the third diffusion control part 30 into the second internal space 40 is controlled to have a gradient that is always constant. In use as the NOx sensor, the oxygen concentration in the second internal space 40 is maintained at a constant value of approximately 0.001 ppm by the action of the main pump cell 21 and the auxiliary pump cell 50.

The fourth diffusion control part 60 is a part providing predetermined diffusion resistance to the measurement gas having an oxygen concentration (oxygen partial pressure) controlled by operation of the auxiliary pump cell 50 in the second internal space 40, and guiding the measurement gas to the third internal space 61.

The third internal space 61 is an internal space located farthest from the gas inlet 10, and is provided as a space (measurement internal space) to perform processing concerning measurement of the nitrogen oxide (NOx) concentration of the measurement gas introduced through the fourth diffusion control part 60. The NOx concentration is measured by operation of a measurement pump cell 41 in the third internal space 61. The measurement gas having the oxygen concentration adjusted with high accuracy in the second internal space 40 is introduced into the third internal space 61, so that the NOx concentration can be measured with high accuracy in the gas sensor 100.

The measurement pump cell 41 is to measure the NOx concentration of the measurement gas introduced into the third internal space 61. The measurement pump cell 41 is an electrochemical pump cell including a measurement electrode 44, the outer pump electrode 23, the second solid electrolyte layer 6, the spacer layer 5, and the first solid electrolyte layer 4. The measurement electrode 44 is provided on an upper surface of a portion of the first solid electrolyte layer 4 facing the third internal space 61 to be separated from the third diffusion control part 30.

The measurement electrode 44 is a porous cermet electrode of a noble metal and a solid electrolyte. For example, the measurement electrode 44 is formed as a cermet electrode of Pt or an alloy of Pt and another noble metal, such as Rh, and $ZrO_2$ as a constituent material for the sensor element 101. The measurement electrode 44 also functions as a NOx reduction catalyst to reduce NOx present in an atmosphere in the third internal space 61.

The measurement pump cell 41 can pump out oxygen generated through decomposition of NOx in the atmosphere in the third internal space 61, and detect the amount of generated oxygen as a pump current Ip2 under control performed by the controller 110.

To detect the oxygen partial pressure around the measurement electrode 44, the second solid electrolyte layer 6, the spacer layer 5, the first solid electrolyte layer 4, the third substrate layer 3, the measurement electrode 44, and the reference electrode 42 constitute a measurement sensor cell 82 as an electrochemical sensor cell. A variable power supply 46 is feedback controlled based on electromotive force V2 as a potential difference caused between the measurement electrode 44 and the reference electrode 42 detected by the measurement sensor cell 82 in accordance with the oxygen partial pressure in the third internal space 61.

NOx in the measurement gas introduced into the third internal space 61 is reduced by the measurement electrode 44 ($2NO \rightarrow N_2+O_2$) to generate oxygen. Oxygen as generated is to be pumped by the measurement pump cell 41, and, in this case, a voltage (measurement pump voltage) Vp2 of the variable power supply 46 is controlled so that the electromotive force V2 detected by the measurement sensor cell 82 is constant. The amount of oxygen generated around the measurement electrode 44 is proportional to the NOx concentration of the measurement gas, and thus the NOx concentration of the measurement gas is to be calculated using the pump current Ip2 in the measurement pump cell 41. The pump current Ip2 is hereinafter also referred to as a NOx current Ip2.

In the case that the measurement electrode 44, the first solid electrolyte layer 4, the third substrate layer 3, and the reference electrode 42 are combined to constitute an oxygen partial pressure detection means as an electrochemical sensor cell, electromotive force in accordance with a difference between the amount of oxygen generated through reduction of a NOx component in the atmosphere around the measurement electrode 44 and the amount of oxygen contained in reference air can be detected, and the concentration of the NOx component in the measurement gas can thereby be determined.

The second solid electrolyte layer 6, the spacer layer 5, the first solid electrolyte layer 4, the third substrate layer 3, the outer pump electrode 23, and the reference electrode 42 constitute an electrochemical sensor cell 83, and oxygen partial pressure of the measurement gas outside the sensor can be detected using electromotive force Vref determined by the sensor cell 83.

The sensor element 101 further includes a heater part 70 playing a role in temperature adjustment of heating the sensor element 101 and maintaining the temperature thereof to enhance oxygen ion conductivity of the solid electrolyte forming the base part.

The heater part 70 mainly includes a heater electrode 71, a heater element 72, a heater lead 72a, a through hole 73, a heater insulating layer 74, a pressure dissipation hole 75, and a heater resistance detection lead, which is not illustrated in FIG. 1. A portion of the heater part 70 other than the heater electrode 71 is buried in the base part of the sensor element 101.

The heater electrode 71 is an electrode formed to be in contact with a lower surface of the first substrate layer 1 (the other main surface of the sensor element 101).

The heater element 72 is a resistive heating element provided between the second substrate layer 2 and the third substrate layer 3. The heater element 72 generates heat by being powered from a heater power supply, which is not illustrated in FIG. 1, outside the sensor element 101 through the heater electrode 71, the through hole 73, and the heater lead 72a, which constitute a current-carrying path. The heater element 72 is formed of Pt, or contains Pt as a main component. The heater element 72 is buried, in a predetermined range of the sensor element 101 in which the gas distribution part is provided, to oppose the gas distribution part in a thickness direction of the element. The heater element 72 is provided to have a thickness of approximately 10 µm to 20 µm.

In the sensor element 101, each part of the sensor element 101 can be heated to a predetermined temperature and the temperature can be maintained by allowing a current to flow through the heater electrode 71 to the heater element 72 to thereby cause the heater element 72 to generate heat. Specifically, the sensor element 101 is heated so that the temperature of the solid electrolyte and the electrodes in the vicinity of the gas distribution part is approximately 700° C. to 900° C. The oxygen ion conductivity of the solid electrolyte forming the base part of the sensor element 101 is enhanced by the heating. A heating temperature of the heater element 72 when the gas sensor 100 is in use (when the sensor element 101 is driven) is referred to as a sensor element driving temperature.

A degree of heat generation (heater temperature) of the heater element 72 is grasped by the magnitude of a resistance value (heater resistance) of the heater element 72.

Figure 2:
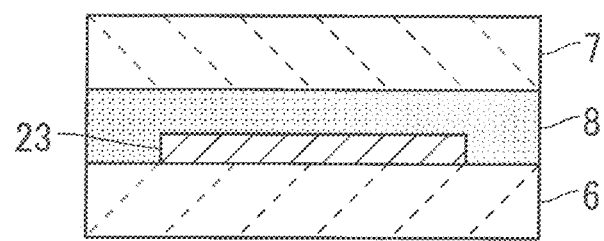
FIG. 2 is a partial cross-sectional view perpendicular to a longitudinal direction of the sensor element 101 for describing the layout of a ceramic layer 7 and a porous body region 8.

In addition to components as described above, the sensor element 101 of the gas sensor 100 according to the present embodiment further includes a ceramic layer 7 and a porous body region 8 over the second solid electrolyte layer 6. FIG. 2 is a partial cross-sectional view perpendicular to the longitudinal direction of the sensor element 101 for describing the layout of the ceramic layer 7 and the porous body region 8. Assume that a direction coming out of the page of FIG. 2 is a direction toward the leading end of the sensor element 101 where the gas inlet 10 is provided.

The ceramic layer 7 is provided over the second solid electrolyte layer 6 to cover the entire surface thereof. While the ceramic layer 7 is adjacent to a large portion of the second solid electrolyte layer 6, the ceramic layer 7 is spaced apart from the outer pump electrode 23 and a region (hereinafter, an electrode sideward region) on the upper surface of the second solid electrolyte layer 6 located at a side of (to the left and the right in FIG. 2 of) the outer pump electrode 23 in a transverse direction of the element (a left-right direction in FIG. 2). A region between the outer pump electrode 23 and the ceramic layer 7 and a region between the electrode sideward region of the second solid electrolyte layer 6 and the ceramic layer 7 are the porous body region 8. The porous body region 8 is provided to cover the outer pump electrode 23 and to be exposed in opposite end portions (left and right end portions in FIG. 2) in the transverse direction of the element, and the ceramic layer 7 is provided to cover the entire upper surface of the second solid electrolyte layer 6 including the porous body region 8.

More particularly, the ceramic layer 7 is formed of ceramics (e.g., zirconia and alumina) that is dense to the same degree as the second solid electrolyte layer 6 and the like.

On the other hand, the porous body region 8 is formed of a porous body (e.g., alumina) having a porosity of approximately 30% to 60%. The porous body region 8 is formed so that a thickness of the porous body region 8 above the outer pump electrode 23 (i.e., a distance between the outer pump electrode 23 and the ceramic layer 7 in the thickness direction of the element) is approximately 25 µm to 40 µm.

The ceramic layer 7 and the porous body region 8 are formed by a known method, such as printing, after a portion of the sensor element 101 other than the ceramic layer 7 and the porous body region 8 is formed in advance, for example. Alternatively, the ceramic layer 7 and the porous body region 8 may be formed by further laminating, on a green sheet laminate forming the above-mentioned six solid electrolyte layers, materials eventually becoming the ceramic layer 7 and the porous body region 8 by a known method, such as printing, and firing the laminate for integration.

The sensor element 101 includes the ceramic layer 7 and the porous body region 8 having such a configuration, so that, in the sensor element 101, predetermined diffusion resistance is provided to oxygen passing through the porous body region 8 when oxygen is pumped in and out between an inside and an outside of the sensor element 101 through the outer pump electrode 23.

A thermal shock resistant protective layer as a single- or multi-porous layer covering the sensor element 101 may further be provided outside in a predetermined range on a side of the one leading end portion (side of the left end in FIG. 1) of the sensor element 101. The thermal shock resistant protective layer is provided to prevent cracking of the sensor element 101 due to thermal shock caused by moisture contained in the measurement gas adhering to the sensor element 101 and condensing when the gas sensor 100 is in use and to prevent poisoning substances coexisting in the measurement gas from entering into the sensor element 101. A laminar gap (gap layer) may be formed between the sensor element 101 and the thermal shock resistant protective layer.

The sensor element 101 is contained in an unillustrated containment member (casing) of metal so that a portion between a side of the gas inlet 10 and a side of the reference gas introduction space 43 is sealed to be airtight. The sensor element 101 and the containment member constitute a main body of the gas sensor 100. The main body is attached to a point of use, such as an engine exhaust pipe, when the gas sensor 100 is in practical use. Wires are drawn from the containment member in which electrical connection between the wires and each part of the sensor element 101 is secured, and are connected to the controller 110, various power supplies, and the like as appropriate.

When the gas sensor 100 having a configuration as described above measures the NOx concentration, the main pump cell 21 and, further, the auxiliary pump cell 50 are operated so that feedback control to make the oxygen concentration in the first internal space 20 and, further, the second internal space 40 constant is performed, and the measurement gas having a constant oxygen concentration is introduced into the third internal space 61, and reaches the measurement electrode 44. For example, when the measurement gas is a lean atmosphere, the measurement gas having oxygen partial pressure sufficiently reduced to a degree (e.g., 0.0001 ppm to 1 ppm) having substantially no effect on measurement of NOx is introduced into the third internal space 61.

The measurement electrode 44 reduces NOx in the reaching measurement gas to generate oxygen. While the oxygen is pumped out by the measurement pump cell 41, the NOx current Ip2 flowing at the pumping out has a constant functional relationship (hereinafter referred to as sensitivity characteristics) with the NOx concentration of the measurement gas.

The sensitivity characteristics are identified in advance prior to practical use of the gas sensor 100 using a plurality of types of model gases having known NOx concentrations, and data thereof is stored in the controller 110. In practical use of the gas sensor 100, a signal representing a value of the NOx current Ip2 flowing in accordance with the NOx concentration of the measurement gas is provided to the controller 110 on a moment-to-moment basis. The controller 110 successively calculates NOx concentrations based on the value and the identified sensitivity characteristics, and outputs values thereof as NOx sensor detection values. The NOx concentration of the measurement gas can thereby be grasped in almost real time using the gas sensor 100.

Target values of the electromotive force V0, the electromotive force V1, and the electromotive force V2 in the main sensor cell 80, the auxiliary sensor cell 81, and the measurement sensor cell 82 when feedback control is performed on the main pump cell 21, the auxiliary pump cell 50, and the measurement pump cell 41 may be set as appropriate in accordance with a specific configuration and the size of each part of the sensor element 101, and, further, a usage condition, a usage pattern, and the like of the gas sensor 100.

Relationship Between Pump Limiting Current Ratio and Measurement Gas Atmosphere

It is assumed that the gas sensor 100 according to the present embodiment mainly operates in the above-mentioned normal mode, that is, identifies the NOx concentration of the measurement gas under a condition in which oxygen is relatively sufficiently contained in the measurement gas, such as the lean atmosphere.

More particularly, when the gas sensor 100 is operated in the normal mode, the main pump cell 21 operates so that the electromotive force V0 generated in the main sensor cell 80 has a predetermined value in accordance with a value desired as an oxygen concentration value (or an oxygen partial pressure value) in the first internal space 20, but the oxygen concentration of the measurement gas introduced into the first internal space 20 from the external space changes from moment to moment, so that the main pump cell 21 performs both pumping in and out of oxygen even under the lean atmosphere.

In contrast, while the auxiliary pump cell 50 and the measurement pump cell 41 can structurally pump in oxygen, values of the electromotive force V1 in the auxiliary sensor cell 81 and the electromotive force V2 in the measurement sensor cell 82 as control target values when these pump cells are operated are set based on the assumption that oxygen is pumped out in principle of measurement of the NOx concentration. That is to say, the auxiliary pump cell 50 and the measurement pump cell 41 exclusively pump out oxygen when the gas sensor 100 is operated in the normal mode.

The gas sensor 100, however, is not always used under an atmosphere in which oxygen is sufficiently contained, and is sometimes used in an environment in which an atmosphere gas can be a rich gas having a small air-fuel ratio or λ value (air ratio), for example, when the main body of the gas sensor 100 is attached to an exhaust path of a gasoline engine, and the exhaust gas from the engine is the measurement gas. In this case, the measurement gas introduced into the sensor element 101 is the rich gas, and the main pump cell 21 tries to maintain the oxygen concentration value in the first internal space 20 by pumping in oxygen from an outside.

The gas sensor 100 can thus be used under a richer gas atmosphere (having a smaller air-fuel ratio) as the main pump cell 21 has a higher oxygen pumping in ability under a rich gas atmosphere.

In the present embodiment, a pump limiting current ratio is used as an indicator of fitness for use of the gas sensor 100 under the rich gas atmosphere, which is a ratio of the magnitude of the main pump current Ip0 (referred to as a reference pump-in current) flowing through the main pump cell 21 to pump in oxygen to the first internal space 20 when the measurement gas is the rich atmosphere to the magnitude of the main pump current Ip0 (referred to as a reference pump-out current) flowing through the main pump cell 21 to pump out oxygen from the first internal space 20 when the measurement gas is the lean atmosphere.

Specifically, a ratio of the magnitude of the reference pump-in current when an evaluation gas (a pump-in current evaluation gas) having a known oxygen concentration, which can be considered as a sufficiently rich gas atmosphere, is introduced as the measurement gas with respect to the magnitude of the reference pump-out current when an evaluation gas (a pump-out current evaluation gas) having a known oxygen concentration, which can be considered as a sufficiently lean gas atmosphere, is introduced as the measurement gas is defined as the pump limiting current ratio.

That is to say, fitness for use of the gas sensor 100 under the rich gas atmosphere is expressed by the magnitude of a value of a pump limiting current ratio A/B, where A is the magnitude of the reference pump-in current, B is the magnitude of the reference pump-out current. When the inner pump electrode 22 and the outer pump electrode 23 do not differ in size and the measurement gas has a constant oxygen concentration, the magnitude of the reference pump-in current as a limiting current when oxygen is pumped in is in accordance with the magnitude of diffusion resistance provided by the porous body region 8 to the measurement gas outside the sensor element 101 introduced into the outer pump electrode 23 through the porous body region 8. The magnitude of the reference pump-out current as a limiting current when oxygen is pumped out is similarly in accordance with the magnitude of diffusion resistance provided by the gas distribution part to the measurement gas introduced from the gas inlet 10 into the first internal space 20, when the measurement gas has a constant oxygen concentration.

Assume that a mixed gas having an oxygen concentration of 20.5% and containing $H_2O$ of 2% and $N_2$ as the balance is used as the pump-out current evaluation gas in the present embodiment. Assume that a mixed gas having an oxygen concentration of 5% and containing $H_2O$ of 3% and $N_2$ as the balance is used as the pump-in current evaluation gas. The pump-out current evaluation gas and the pump-in current evaluation gas having other oxygen concentrations may be used.

The reason why the reference pump-out current under the lean atmosphere is considered to evaluate fitness for use under the rich atmosphere is that the magnitude of the limiting current flowing through the main pump cell 21 depends on diffusion resistance provided to the measurement gas flowing from the gas inlet to the internal space for each of the pump-out current and the pump-in current, and there is a correlation between a value of the pump-out current under the lean atmosphere and a value of the pump-in current under the rich atmosphere, so that an effect of the above-mentioned diffusion resistance on the pump-in current under the rich atmosphere can be considered by measuring the reference pump-out current under the lean atmosphere.

While the magnitude of the pump limiting current depends on the shape, the size, and the like of the electrodes and the gas distribution part, an effect thereof may be offset in evaluation of the pump limiting current ratio A/B as a ratio of the reference pump-in current to the reference pump-out current flowing through the same main pump cell 21, that is, between the same inner pump electrode 22 and the same outer pump electrode 23. That is to say, a value of the pump limiting current ratio A/B can be compared between gas sensors 100 differing in sizes of the inner pump electrode 22 and the outer pump electrode 23.

On the other hand, a degree of the rich gas atmosphere to which each of the gas sensors 100 can actually be used is identified by evaluating a controllable λ threshold.

Specifically, the controllable λ threshold is identified through Ip1 constant control in which the gas sensor 100 is operated so that the auxiliary pump current Ip1 having a constant magnitude flows through the auxiliary pump cell 50, while the λ value is gradually varied from a lean side to a rich side with the gas sensor 100 being operated. A λ value of the measurement gas immediately before a value of the auxiliary pump current Ip1 deviates by a predetermined threshold or more without being able to maintain a predetermined control target value as a result of limitation of an oxygen pumping in ability of the main pump cell 21 is identified as the controllable λ threshold. When the auxiliary pump cell 50 performs good Ip1 constant control, the NOx current in accordance with the NOx concentration of the measurement gas can be measured with high accuracy in the measurement pump cell 41. The sensor element 101 is preferably formed to allow an auxiliary pump current Ip1 of 3 µA to 10 µA to flow in terms of suitable Ip1 constant control.

Figure 3:
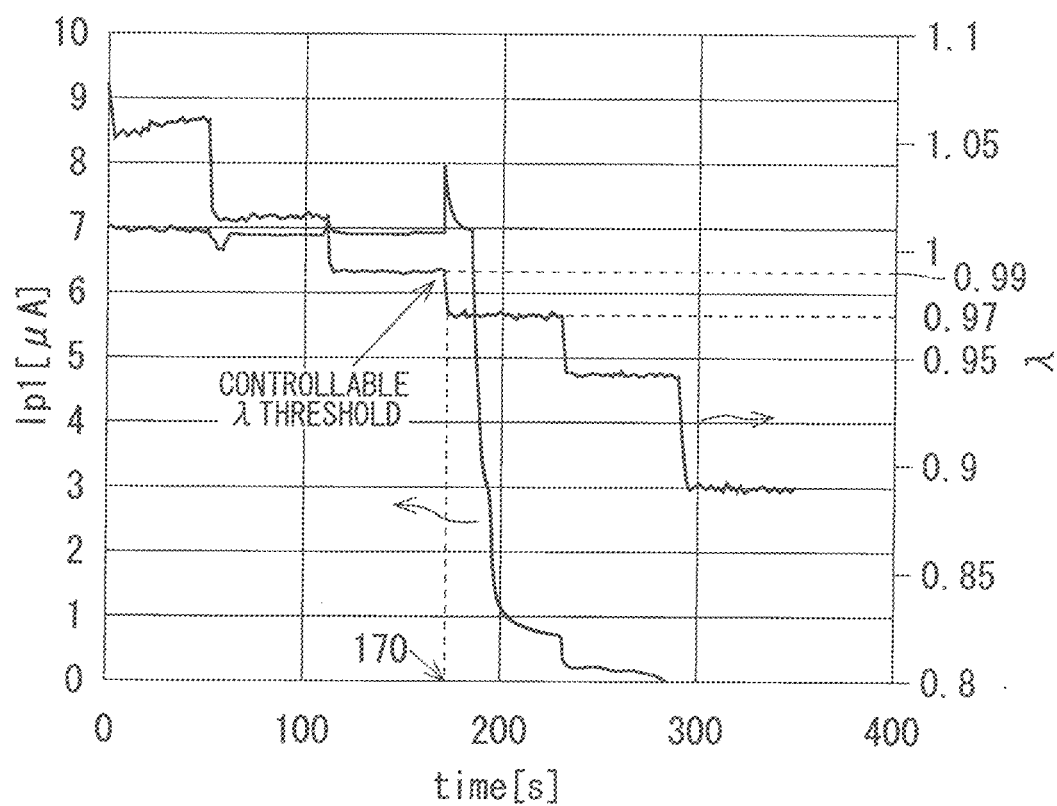
FIG. 3 is a diagram showing one example of evaluation of a controllable λ threshold.

FIG. 3 is a diagram showing one example of evaluation of the controllable λ threshold. Specifically, FIG. 3 shows a state when Ip1 constant control is performed on a certain gas sensor 100 so that the control target value of the auxiliary pump current Ip1 is 7 µA while the λ value of the measurement gas is reduced stepwise at intervals of 60 seconds from 1.05 as an initial value under the lean atmosphere.

In the example shown in FIG. 3, while the value of the auxiliary pump current Ip1 is maintained at approximately 7 µA until a time when the λ value is 0.99, the auxiliary pump current Ip1 is greatly changed from the 7 µA at a time when the λ value is stepped down from 0.99 to 0.97 after the elapse of approximately 170 seconds. In this case, it is determined that the controllable λ threshold is 0.99.

The controllable λ threshold evaluated as described above has a negative correlation with the pump limiting current ratio A/B, and specifically has the following correspondence relationship:

A/B<0.07→controllable λ threshold=0.97;

0.07≤A/B≤0.20→0.95≤controllable λ threshold≤0.97; and 0.20<A/B(<1.0)→controllable λ threshold≤0.95.

The correspondence relationship indicates that, when the gas sensor 100 in which the pump limiting current ratio A/B is 0.07 or more is used, for example, the gas sensor 100 can perform good measurement of the NOx concentration not only under the lean atmosphere but also under a rich atmosphere at least in a range from stoichiometric composition to a λ value of 0.97.

According to the above-mentioned correspondence relationship, measurement can be performed under a richer atmosphere when the pump limiting current ratio A/B has a greater value, and, in a case of an exhaust gas from a typical gasoline engine, it can be said that a gas sensor 100 in which the pump limiting current ratio A/B is 0.2 or more has sufficient fitness for use enabling use for measurement of the exhaust gas from the typical gasoline engine without any problems as the λ value under the rich atmosphere is approximately 0.95 to 0.97 at minimum. The pump limiting current ratio A/B can be determined as long as the sensor element 101 is formed so that the magnitude A of the reference pump-in current is 14 mA or more.

On the other hand, when the magnitude B of the reference pump-out current is constant, a value of the main pump voltage Vp0 applied to the main pump cell 21 when oxygen is pumped in increases with increasing pump limiting current ratio A/B, but, because blackening is more likely to be caused as the main pump voltage Vp0 has an excessively greater value, the magnitude A of the reference pump-in current is preferably 5 mA or less, and the value of the pump limiting current ratio A/B is preferably less than 1.0.

As described above, according to the present embodiment, good measurement of the NOx concentration can be performed not only under the lean atmosphere but also under the rich atmosphere at least in the range from the stoichiometric composition to the λ value of 0.97 by setting the pump limiting current ratio in the gas sensor to 0.07 or more.

Modifications

While the gas sensor includes the sensor element having three spaces therein in the above-mentioned embodiment, a configuration (e.g., patterns of the internal spaces) of the sensor element that can suitably be used even under the rich atmosphere by setting the pump limiting current ratio to a predetermined value is not limited to that in the above-mentioned embodiment. Another configuration may be used as long as the pump limiting current ratio can be measured and the controllable λ threshold can be identified under Ip1 constant control.

A ceramic layer similar to the ceramic layer 7 may be provided to cover the first substrate layer 1 at a lower end of the sensor element 101 in FIG. 1.

EXAMPLES

As Examples, eight types (levels) of gas sensors 100 (Examples 1 to 8) having various combinations of a porosity of the porous body region 8 provided around the outer pump electrode 23 and the thickness of the porous body region 8 above the outer pump electrode 23, but otherwise having the same configuration were manufactured, and, for each of them, the pump limiting current ratio A/B and the controllable λ threshold were determined, and, based on the determined controllable λ threshold, fitness for use of the gas sensor 100 under the rich atmosphere when it was assumed that the exhaust gas from the typical gasoline engine was the measurement gas was determined.

The mixed gas having an oxygen concentration of 20.5% and containing $H_2O$ of 2% and $N_2$ as the balance was used as the pump-out current evaluation gas. The mixed gas having an oxygen concentration of 5% and containing $H_2O$ of 3% and $N_2$ as the balance was used as the pump-in current evaluation gas.

As Comparative Examples, gas sensors 100 each having a similar configuration to Examples 1 to 8 except that a slit-like space was formed at a location where the porous body region 8 was originally formed were prepared, and were evaluated similarly to Examples 1 to 8. The gas sensors 100 according to Comparative Examples each virtually correspond to a gas sensor in which the porosity of the porous body region 8 is 100%.

Table 1 shows, for each of the gas sensors 100 according to Examples 1 to 8 and Comparative Examples, a type of a structure and a porosity around the outer pump electrode 23, the thickness above the outer pump electrode 23, the magnitude A of the reference pump-in current, the magnitude B of the reference pump-out current, the pump limiting current ratio A/B, the controllable λ threshold, and a result of determination of fitness for use under the rich atmosphere as a list. In Table 1, names of these items are sequentially shown as "STRUCTURE AROUND OUTER ELECTRODE", "POROSITY AROUND OUTER ELECTRODE", "FILM THICKNESS AROUND OUTER ELECTRODE", "PUMP-IN LIMITING CURRENT A", "PUMP-OUT LIMITING CURRENT B", "RATIO A/B", "THRESHOLD", and "DETERMINATION". In evaluation of the controllable λ value, the control target value of the auxiliary pump current Ip1 was set to 7 μA.

Determination on fitness for use was evaluated in three stages. Specifically, the gas sensors 100 in each of which the controllable λ threshold was less than 0.95 were determined to have sufficient fitness for use under the rich atmosphere when it was assumed that the exhaust gas from the typical gasoline engine was the measurement gas, and a double circle is marked in the item "DETERMINATION". The gas sensors 100 in each of which the controllable λ threshold was 0.95 or more and 0.97 or less were determined to have generally good fitness for use under the rich atmosphere, and a circle is marked in the item "DETERMINATION". On the other hand, the gas sensors 100 in each of which the controllable λ threshold was more than 0.97 were determined to have substantially no fitness for use under the rich atmosphere, and a cross is marked in the item "DETERMINATION".

Figure 4:
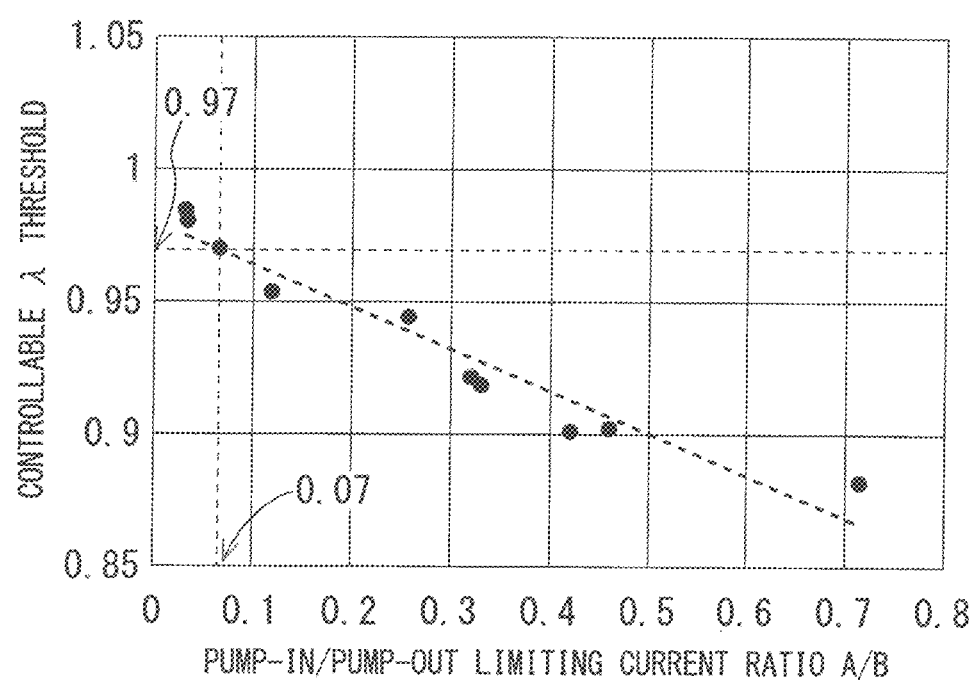
FIG. 4 is a graph of controllable λ thresholds of gas sensors 100 according to Examples 1 to 8 and Comparative Examples plotted against a pump limiting current ratio A/B.

FIG. 4 is a graph of controllable X, thresholds of the gas sensors 100 according to Examples 1 to 8 and Comparative Examples shown in Table 1 plotted against the pump limiting current ratio A/B (shown as "PUMP-IN/PUMP-OUT LIMITING CURRENT RATIO A/B" in FIG. 4).

While the gas sensors 100 according to Examples 1 to 8 have various combinations of the porosity and the thickness of the porous body region 8 as shown in Table 1, it can be seen from FIG. 4 that the controllable λ thresholds of the gas sensors 100 have a negative linear correlation with the pump limiting current ratio A/B.

More specifically, when the pump limiting current ratio A/B is 0.07 or more, the controllable λ threshold is 0.97 or less regardless of the combination of the porosity and the thickness of the porous body region 8 in FIG. 4. The result indicates that the pump limiting current ratio A/B in the gas sensor 100 of 0.07 or more allows for generally good use of the gas sensor 100 even under the rich atmosphere.

Furthermore, when the pump limiting current ratio A/B is more than 0.20, the controllable λ threshold is less than 0.95 regardless of the combination of the porosity and the thickness of the porous body region 8 in FIG. 4. The result indicates that the pump limiting current ratio A/B in the gas sensor 100 of more than 0.20 allows for use of the gas sensor 100 without any problems under the rich atmosphere.

While the invention has been shown and described in detail, the foregoing description is in all aspects illustrative and not restrictive. It is therefore understood that numerous modifications and variations can be devised without departing from the scope of the invention.

TABLE 1

| LEVEL | STRUCTURE AROUND OUTER ELECTRODE | POROSITY AROUND OUTER ELECTRODE [%] | FILM THICKNESS AROUND OUTER ELECTRODE [μm] | PUMP-IN LIMITING CURRENT A [mA] | PUMP-OUT LIMITING CURRENT B [mA] | RATIO A/B | THRESHOLD | DETERMINATION |
|---|---|---|---|---|---|---|---|---|
| EXAMPLE 1 | POROUS BODY | 50 | 30 | 0.8 | 2.43 | 0.33 | 0.92 | ⊚ |
| EXAMPLE 2 | POROUS BODY | 30 | 30 | 0.17 | 2.48 | 0.07 | 0.97 | ○ |
| EXAMPLE 3 | POROUS BODY | 45 | 30 | 1.02 | 2.43 | 0.42 | 0.902 | ⊚ |
| EXAMPLE 4 | POROUS BODY | 60 | 30 | 1.7 | 2.39 | 0.71 | 0.883 | ⊚ |
| EXAMPLE 5 | POROUS BODY | 40 | 25 | 0.29 | 2.40 | 0.12 | 0.954 | ○ |
| EXAMPLE 6 | POROUS BODY | 45 | 30 | 0.79 | 2.46 | 0.32 | 0.922 | ⊚ |
| EXAMPLE 7 | POROUS BODY | 60 | 30 | 1.14 | 2.48 | 0.46 | 0.903 | ⊚ |
| EXAMPLE 8 | POROUS BODY | 50 | 40 | 0.86 | 3.43 | 0.26 | 0.945 | ⊚ |
| COMPARATIVE EXAMPLE 1 | POROUS BODY | 20 | 20 | 0.1 | 3.11 | 0.03 | 0.985 | X |
| COMPARATIVE EXAMPLE 2 | SPACE (SLIT) | | (5) | 0.812 | 3.50 | 0.03 | 0.983 | X |

What is claimed is:

1. A gas sensor capable of sensing a predetermined gas component in a measurement gas, the gas sensor comprising:
 a sensor element formed of an oxygen-ion conductive solid electrolyte; and a controller controlling operation of the gas sensor, wherein
the sensor element includes:
- a plurality of internal spaces which sequentially communicate with each other from an inlet for the measurement gas under predetermined diffusion resistance, and in which respective inner electrodes are arranged;
- an out-of-space pump electrode disposed at a location other than the plurality of internal spaces;
- a porous body region covering the out-of-space pump electrode; and
- a plurality of electrochemical pump cells arranged to correspond to the respective internal spaces, the plurality of electrochemical pump cells pumping in or out oxygen between the plurality of internal spaces and an outside of the sensor element by applying pump voltages across the inner electrodes in the respective internal spaces and the out-of-space pump electrode from predetermined pump power supplies, the plurality of internal spaces include:
- a first internal space which is located closest to the inlet, and in which a main pump electrode is disposed as one of the inner electrodes; and
- a measurement internal space which is located farthest from the inlet, and in which a measurement electrode is disposed as one of the inner electrodes, the plurality of electrochemical pump cells include:
- a main pump cell including the main pump electrode and the out-of-space pump electrode; and
- a measurement pump cell including the measurement electrode and the out-of-space pump electrode, the controller is configured to:
- control operation of the plurality of electrochemical pump cells other than the measurement pump cell to adjust an oxygen concentration in one or more of the plurality of internal spaces corresponding to the plurality of electrochemical pump cells other than the measurement pump cell,
- control operation of the measurement pump cell to allow a measurement pump current in accordance with a concentration of the predetermined gas component to flow between the measurement electrode and the out-of-space pump electrode, and
- determine the concentration of the predetermined gas component based on a magnitude of the measurement pump current, and the controller is further configured to
control the main pump cell to pump in oxygen to the first internal space so as to allow a reference pump-in current of magnitude A to flow as a limiting current in a case where a pump-in current evaluation gas having a known oxygen concentration is introduced from the inlet to the plurality of internal spaces, and
control the main pump cell to pump out oxygen from the first internal space so as to allow a reference pump-out current of magnitude B to flow as a limiting current in a case where a pump-out current evaluation gas having a known oxygen concentration is introduced from the inlet to the plurality of internal spaces,
wherein a ratio A/B is 0.07 or more.

2. The gas sensor according to claim 1, wherein the ratio A/B is 0.20 or more.

3. The gas sensor according to claim 2, wherein the magnitude A of the reference pump-in current is 5 mA or less.

4. The gas sensor according to claim 3, wherein
the plurality of internal spaces include the first internal space, a second internal space which communicates with the first internal space and in which an auxiliary pump electrode is disposed as one of the inner electrodes, and the measurement internal space as a third internal space communicating with the second internal space,
the plurality of electrochemical pump cells include the main pump cell, an auxiliary pump cell including the auxiliary pump electrode and the out-of-space pump electrode, and the measurement pump cell, and
the controller
controls operation of the main pump cell to adjust an oxygen concentration in the first internal space, and
controls operation of the auxiliary pump cell to adjust an oxygen concentration in the second internal space.

5. The gas sensor according to claim 2, wherein
the plurality of internal spaces include the first internal space, a second internal space which communicates with the first internal space and in which an auxiliary pump electrode is disposed as one of the inner electrodes, and the measurement internal space as a third internal space communicating with the second internal space,
the plurality of electrochemical pump cells include the main pump cell, an auxiliary pump cell including the auxiliary pump electrode and the out-of-space pump electrode, and the measurement pump cell, and
the controller
controls operation of the main pump cell to adjust an oxygen concentration in the first internal space, and
controls operation of the auxiliary pump cell to adjust an oxygen concentration in the second internal space.

6. The gas sensor according to claim 1, wherein
the magnitude A of the reference pump-in current is 5 mA or less.

7. The gas sensor according to claim 6, wherein
the plurality of internal spaces include the first internal space, a second internal space which communicates with the first internal space and in which an auxiliary pump electrode is disposed as one of the inner electrodes, and the measurement internal space as a third internal space communicating with the second internal space,
the plurality of electrochemical pump cells include the main pump cell, an auxiliary pump cell including the auxiliary pump electrode and the out-of-space pump electrode, and the measurement pump cell, and
the controller
controls operation of the main pump cell to adjust an oxygen concentration in the first internal space, and
controls operation of the auxiliary pump cell to adjust an oxygen concentration in the second internal space.

8. The gas sensor according to claim 1, wherein
the plurality of internal spaces include the first internal space, a second internal space which communicates with the first internal space and in which an auxiliary pump electrode is disposed as one of the inner electrodes, and the measurement internal space as a third internal space communicating with the second internal space,
the plurality of electrochemical pump cells include the main pump cell, an auxiliary pump cell including the auxiliary pump electrode and the out-of-space pump electrode, and the measurement pump cell, and the controller
controls operation of the main pump cell to adjust an oxygen concentration in the first internal space, and
controls operation of the auxiliary pump cell to adjust an oxygen concentration in the second internal space.

* * * * *